United States Patent
Zsigmond et al.

(10) Patent No.: US 11,919,044 B2
(45) Date of Patent: *Mar. 5, 2024

(54) SYSTEMS AND METHODS FOR SCANNING INFORMATION FROM STORAGE AREA CONTENTS

(71) Applicant: IKAN HOLDINGS LLC, New York, NY (US)

(72) Inventors: Fabio Zsigmond, Riverside, CT (US); Sion Douer, New York, NY (US); Geraldo Yoshizawa, Sao Paulo (BR); Frederico Wagner, New York, NY (US)

(73) Assignee: Freshhub LTD., Givat Shmuel (IL)

( * ) Notice: Subject to any disclaimer, the term of this patent is extended or adjusted under 35 U.S.C. 154(b) by 205 days.

This patent is subject to a terminal disclaimer.

(21) Appl. No.: 17/345,144

(22) Filed: Jun. 11, 2021

(65) Prior Publication Data

US 2021/0299705 A1 Sep. 30, 2021

Related U.S. Application Data

(63) Continuation of application No. 16/299,505, filed on Mar. 12, 2019, now Pat. No. 11,059,074, which is a
(Continued)

(51) Int. Cl.
*B07C 5/34* (2006.01)
*G06Q 30/0601* (2023.01)
(Continued)

(52) U.S. Cl.
CPC .......... *B07C 5/34* (2013.01); *G06Q 30/0601* (2013.01); *G06Q 40/04* (2013.01); *H04M 1/6505* (2013.01); *H04M 3/533* (2013.01)

(58) Field of Classification Search
CPC ....... H04M 1/6505; H04M 3/533; B07C 5/34; G06Q 40/04; G06Q 30/0601; H04L 47/70
(Continued)

(56) References Cited

U.S. PATENT DOCUMENTS 7,707,039 B2 * 4/2010 King ..................... G06Q 30/02
382/313
7,974,873 B2 * 7/2011 Simmons ......... G06Q 10/06313
705/28

(Continued)

OTHER PUBLICATIONS

Bhargave et al.,International Journal of Scientific and Research Publications, vol. 3, Issue 4, ISSN 2250-3153, Apr. 2013, Digital Ordering System for Restaurant Using Android, pp. 1-7.*

*Primary Examiner* — Andrew Joseph Rudy
(74) *Attorney, Agent, or Firm* — Michael J . Feigin, Esq.; Feigin and Fridman LLC

(57) ABSTRACT

The present invention is related to methods and systems for collected item information for stored items. In one embodiment, a networked food storage system comprises a first sensor configured to read information from item tags coupled to items, wherein the items are stored or intended to be stored in a storage unit. A data store is configured to store food preferences for at least a first user. Instructions, stored in computer readable memory, are configured to: cause a first user interface to be displayed to the first user via which the first user can request a meal suggestion; retrieve preference information for the first user from computer readable memory; retrieve information read from at least a first item tag; and provide a meal suggestion based at least in part on preference information for the first user and item tag information.

16 Claims, 8 Drawing Sheets

Related U.S. Application Data continuation of application No. 15/905,591, filed on Feb. 26, 2018, now Pat. No. 10,239,094, which is a continuation of application No. 15/604,422, filed on May 24, 2017, now Pat. No. 9,908,153, which is a continuation of application No. 11/301,291, filed on Dec. 12, 2005, now Pat. No. 9,821,344.

(60) Provisional application No. 60/635,122, filed on Dec. 10, 2004.

(51) Int. Cl.
*G06Q 40/04* (2012.01)
*H04M 1/65* (2006.01)
*H04M 3/533* (2006.01)

(58) Field of Classification Search
USPC .......................................... 705/30; 209/703
See application file for complete search history.

(56) References Cited

U.S. PATENT DOCUMENTS

| | | | | |
|---|---|---|---|---|
| 8,019,449 | B2* | 9/2011 | Barzegar | H04L 47/70 |
| | | | | 700/94 |
| 9,821,344 | B2* | 11/2017 | Zsigmond | G06Q 40/04 |
| 9,908,153 | B2* | 3/2018 | Zsigmond | B07C 5/34 |
| 10,213,810 | B2* | 2/2019 | Zsigmond | B07C 5/34 |
| 10,232,408 | B2* | 3/2019 | Zsigmond | G06Q 30/0601 |
| 10,239,094 | B2* | 3/2019 | Zsigmond | B07C 5/34 |
| 11,059,074 | B2* | 7/2021 | Zsigmond | B07C 5/34 |
| 2002/0027164 | A1* | 3/2002 | Mault | G16H 20/30 |
| | | | | 235/462.46 |
| 2005/0075934 | A1* | 4/2005 | Knight | A23L 33/30 |
| | | | | 705/15 |
| 2013/0138515 | A1* | 5/2013 | Taniguchi | G06Q 30/0635 |
| | | | | 705/15 |
| 2013/0226651 | A1* | 8/2013 | Napper | G06Q 50/12 |
| | | | | 701/527 |

\* cited by examiner

MEAL SELECTION

- ☐ Breakfast
- ☐ Brunch
- ☐ Lunch
- ☒ Dinner
- ☐ Late night snack

COURSES

- ☐ SOUP
- ☒ SALAD
- ☒ MAIN COURSE
- ☒ DESERT

MEAL PARTICIPANTS

- ☒ MOM
- ☒ DAD
- ☒ BOBBY
- ☒ JANE
- ☐ NANNY
- ☐ GRANDMA
- ☐ GRANDPA
- ☐ GUEST     ☐ NUMBER OF GUEST

[ PROVIDE RECOMMENDATIONS ]

FIG. 5

SALADS

☒ TOMATO SALAD

☐ GREEN SALAD

MAIN COURSE

☐ ROASTED CHICKEN

☒ GRILLED SALMON

DESSERT

☒ SORBET

☐ CHOCOLATE CAKE

| PROVIDE RECIPES | PROVIDE ADDITIONAL SUGGESTIONS |
|---|---|

FIG. 6

☒ MILK          ☐ QUANTITY
☒ ORANGE JUICE  ☐ QUANTITY
☒ YOGURT        ☐ QUANTITY
☐ SODA          ☐ QUANTITY

| SUBMIT ORDER |

FIG. 7

SYSTEMS AND METHODS FOR SCANNING INFORMATION FROM STORAGE AREA CONTENTS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to sensor systems and processes, and in particular for sensing items stored in storage units and performing related automated processes.

Description of the Related Art

Perishable items are often stored in refrigerated storage units, such as refrigerators. Such perishable items often have expiration dates or "best used by dates" printed thereon. However, because perishable items are often densely packed into a refrigerated storage unit, and because the expiration dates are sometimes faintly or poorly printed, users often are not able to conveniently monitor the expiration dates. Hence, items are often retained in the refrigerated storage unit past their expiration date, taking up valuable storage space. In addition, because the user is often unaware of when an item has reached its expiration date, the user often does not replace the expired item in a timely fashion.

SUMMARY OF THE INVENTION

The present invention is related to sensor systems and processes, and in particular for sensing items stored in storage units and performing related automated processes.

The following embodiments are intended to be illustrative examples, and not to limit the scope of the invention.

One example embodiment provides a networked refrigeration system, comprising: a first sensor configured to read information from item tags coupled to items, wherein the items are stored or intended to be stored in a refrigeration unit; a data store configured to store food preferences for a plurality of household members; instructions, stored in computer readable memory, configured to: cause a first user interface to be displayed to the first user, the first user interface listing household members; receive a user input indicating which household members will participate in a first meal; retrieve preference information for at least a portion of the household members that will participate in the first meal; retrieve information read from at least a first item tag; select at least a first recipe stored in computer readable memory based at least in part on preference information for at least one meal participant and item tag information; and provide the recipe to a first user.

Another example embodiment provides a networked food storage system, comprising: a first sensor configured to read information from item tags coupled to items, wherein the items are stored or intended to be stored in a storage unit; a data store configured to store food preferences for at least a first user; instructions, stored in computer readable memory, configured to: cause a first user interface to be displayed to the first user via which the first user can request a meal suggestion; retrieve preference information for the first user from computer readable memory; retrieve information read from at least a first item tag; and provide a meal suggestion based at least in part on preference information for the first user and item tag information.

Still another embodiment provides a method of providing meal suggestions, comprising: electronically receiving data read, via a first sensor, from a first item, the data including information related to the first item's ingredients; identifying a first user requesting a meal suggestion; reading from computer readable memory food preferences for at least the first user; and providing a meal suggestion based at least in part on preference information for the first user and item tag information.

Yet another example embodiment provides a networked food storage system, comprising: a first sensor configured to read expiration date information from item tags, wherein the items are stored or intended to be stored in a storage unit; a data store configured to store expiration date information; and instructions, stored in computer readable memory, configured to: read expiration date information from the data store; determine if a first item has an expiration date within a first time window; if the first item has an expiration date within a first time window, identify the item on a shopping list.

Still another example embodiment provides an electronic system, comprising: memory configured to store a digitized voice recording from a user; and instructions, stored in computer readable memory, configured to: read the digitized voice recording; identify a product identifier that corresponds to a first item referred to in the digitized voice recording; present a shopping list to the user that includes at least the first item.

Another example embodiment provides an electronic system, comprising: memory configured to store a digital product image from a user; and instructions, stored in computer readable memory, configured to: perform object recognition with respect to the product image; select a product identifier that corresponds to the product in the image; present a shopping list to the user that includes at least the product.

BRIEF DESCRIPTION OF THE DRAWINGS

Embodiments of the present invention are described herein with reference to the drawings summarized below. These drawings and the associated description are provided to illustrate example embodiments of the invention, and not to limit the scope of the invention.

FIG. 5 illustrates a first example meal suggestion request user interface.

FIG. 6 illustrates a second example meal suggestion request user interface.

FIG. 7 illustrates an example user interface for ordering items.

DETAILED DESCRIPTION OF PREFERRED EMBODIMENTS

Figure 1:
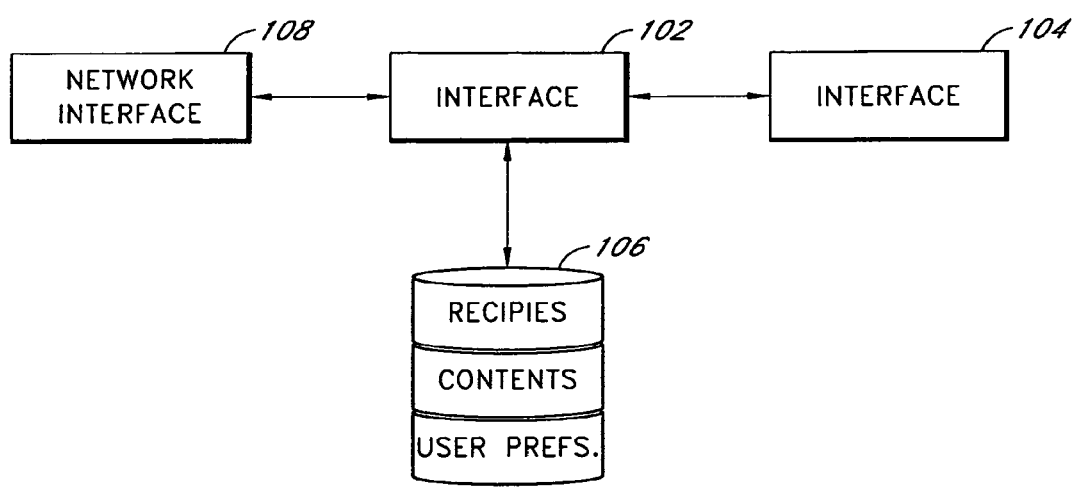
FIG. 1 illustrates an example embodiment of an item tracking and recommendation processing system.

Example systems and methods for scanning and obtaining product information and processing such scanned information will be described herein.

Throughout the following description, the term "Web site" is used to refer to a user-accessible network site that implements the basic World Wide Web standards for the coding and transmission of hypertextual documents. These standards currently include HTML (the Hypertext Markup Language), HTTP (the Hypertext Transfer Protocol), Java, and XML. It should be understood that the term "site" is not intended to imply a single geographic location, as a Web or other network site can, for example, comprise multiple geographically distributed computer systems that are appropriately linked together. Furthermore, while the following description relates to an embodiment utilizing the Internet and related protocols, other networks, such as networked interactive televisions, and other protocols may be used as well. In addition, unless otherwise indicated, the functions described herein are preferably performed by executable code and instructions running on one or more general-purpose computers. For example, program code stored in non-volatile and/or volatile memory can include one or more instructions, which can optionally be straight-line code and/or organized as modules or objects configured to receive and process inputs, provide outputs, and to selectively store data. However, the present invention can also be implemented using special purpose computers, state machines, and/or hardwired electronic circuits. While certain example processes are described herein, not all the process states need to be performed, and the order of the process can be varied. While several example embodiments are described with reference to RFID tags and RFID scanners, other tags (e.g., barcodes) and scanners (e.g., a laser barcode scanner), can be used.

In an example embodiment, a networked system includes one or more scanning devices that can scan product information. For example, a scanning system can optionally include one or more of an optical barcode scanner, an RFID (radio frequency identifier) scanner, a character recognition scanner, a camera, and/or other scanner types. The scanning system can be configured to scan/read optical markings such as barcodes (printed or lasered onto the item packaging or the consumable item itself), RFID tags (e.g., a radio frequency transponder), solid state memory tags, and/or magnetic tags. The foregoing data devices are generally referenced herein tags. By way of further example, the scanning system can take electronic, digital pictures of product packaging or markings, or scan/read other information storage devices.

In certain example embodiments, one or more scanning devices and/or related processing systems can be fixedly coupled or removably coupled to a utility device, such as a refrigerator, a conventional oven, a microwave oven, or other device. Optionally, one or more scanning devices and/or related processing systems can be mounted to a wall, inside or outside of a cabinet, or on a stand.

The scanner system can include or be coupled to a local content database and/or can be connected to a remote database via a network, such as the Internet. In addition, the scanner system can be coupled to a suggestion application and database that stores food and/or meal preferences for one or more users. For example, a user can specify types of foods, dishes, or other products that the user prefers or will not eat, wherein the user specifications are stored in the database, optionally in association with an identifier (e.g., a user ID and/or password).

By way of illustration, the user can specify that the user does not want to eat foods containing pork, poultry, beef, fish, gluten, wheat, eggs, nuts, strawberries, and/or seafood. By way of further illustration, the user can specify that the user prefers foods having a certain characteristic or that are in a certain category, such as vegetarian, low fat, low sodium, and/or kosher food products.

The scanner system can include or be coupled to one or more user input and/or output devices, such as a touch screen device, a non-touch screen display, an on/off switch, a mechanical keyboard, voice recognition system, a voice output system, a camera, a character recognition device, a printer, and/or other types of user interfaces. The system optionally can include one or more function-specific hard keys and/or soft keys displayed on a touch screen. The key functions can be software programmable.

An example tag can include some or all of the following information: product code, expiration date, nutrition information, dietary classification information (e.g., low sodium, low cholesterol, low carbohydrate, non-fat, peanut-free, gluten-free, sugar-free, non-dairy, vegetarian), ingredient content, supplier, product, storage temperature range, dimensions (height, length, width, weight), cooking temperature and time, a unique item/tag identifier, etc. Optionally, the tag can further include an identifier associated with an intended user.

If the tag is an RFID tag, the tag can include a RFID chip, with associated memory, an antenna, and optionally a battery. Optionally, an RFID tag can be a chipless tag, that does not use integrated circuit technology to store information, but that does use materials (e.g. fiber) that reflects a portion of the scanner's signal back to the scanner, which can then be used as an identifier. By way of further example, if the tag is an RFID tag, the tag can be powered via a battery, electromagnetically by the RFID scanner, or otherwise.

As will be described below, the scanning system scans item tags and optionally stores some or all of the scanned information in a computer readable data store, such as a database. Optionally, a user can then view some or all of the stored information via a display coupled to the scanning system.

By way of further example, the system can read or scan product information located on or in item tags for items stored, or that are in the process of being stored, inside a refrigerator and/or stored in different household locations including shelves, cabinets, dry storage rooms, pantries, automobile trunks, etc. The scanning can optionally be performed utilizing a network of scanners and/or repeaters in the house.

Thus, for example, one or more scanners, such as an RFID scanner can be placed in, or adjacent to a home refrigerator, as well as on or in proximity with food storage shelves and/or cabinets. The scanner location can be based on the scanner range, wherein the scanner is placed within a useable range of the items to be scanned, and the location can be further selected so that a barrier does not interfere with the scanner's ability to read item tags.

The scanner can be powered via a battery, AC power or otherwise. The scanner can optionally be mounted in or to a refrigerator wall. The RFID scanner optionally includes an antenna or coil, a transceiver, and a decoder. The transceiver produces signals that are emitted by the antenna as radio signals. The radio signals are optionally used to activate the RF tag and to read and optionally write data to the tag. The RFID scanner is optionally shielded by a substantially RF transparent cover to protect the sensor from dirt and/or moisture.

The scanner can periodically (e.g., every 30 seconds, every 15 minutes, every hour, or other regular or irregular time period), in response to a user action (e.g., opening or closing a refrigerator door), and/or other trigger (e.g., a weight change detected via a weight sensor) read items tags for items stored within the refrigerator. Optionally, between scans, the scanner can enter into a power down/low power consumption state to conserve power. Optionally, the user can manually cause an item tag to be scanned. For example, if the tag is an optical barcode, the user can manually press a scan button and/or pass the barcode in front of a barcode scanner.

In addition to scanners that read tag information, one or more sensors can be provided that sense the presence of an item without necessarily reading an item tag. For example, one or more pressure sensors can be coupled to one or more shelves to detect if the shelve has an item stored thereon. Other sensors, such as capacitor sensors, millimeter wave sensors, or infrared sensors can be used as well.

A local and/or remote computer processing system can access the stored information, and based on some or all of the stored information, perform one or more of processes, examples of which are described below. Optionally, a user can specify how at least a portion of the information is to be used.

Based on the scanned tag information, the system can determine when products that are inside the refrigerator, on dry products shelves, and/or other selected locations, will expire and will remind or suggest to the user (through a user interface, such as a touch screen display, a voice print, a hardcopy printout, etc.) that the products be consumed on or before the expiration date. The suggestion or reminder can first be provided by the system a number of days before the expiration date, wherein the number of days can be a default value stored in computer readable memory and/or can be based on a value set by the user and stored in computer readable memory. Optionally, in addition, the user can specify that expiration notices are to be provided for certain specified items and/or the user can specify that expiration notices are not to be provided for certain specified items.

Optionally, when a suggestion or reminder is provided, the user can instruct the system not to provide further reminders regarding the expiring product or can instruct the system to provide another reminder at or after a specified time or period (e.g., a snooze instruction).

The system will optionally suggest the reordering of products based on one or more of expiration dates, consumption patterns, delivery schedules, current household item inventory, and user preferences, such as: special diets, as fat free diet, low carb. diet, vegetarian diet, Kosher food only, or other special or selected diet.

As similarly described above, the suggestion or reminder can first be provided a number of days before the expiration date, wherein the number of days can be a default value stored in computer readable memory and/or can be based on a value set by the user and stored in computer readable memory. Optionally, when a suggestion is provided, the user can optionally instruct the system not to provide further reminders regarding the product or can instruct the system to provide another reminder at a specified time or period.

Other consumer food-related information can also be accessed and utilized by the system from computer memory. For example, recipes can be stored on a local and/or a remote information system. The recipes can include ingredients, quantities, and instruction of preparation. Optionally, the system can store and/or calculate from stored information, recipe ingredient quantity information for different serving sizes.

Optionally, the recipes can be selected or downloaded from another computer system based on the products available in the house, including the contents inside the refrigerator and on other various locations in the house.

The system can compare the available products or contents (e.g., those stored in the refrigerator and/or in other storage locations) with stored recipes, a serving size specified by the user, and/or user preferences, such as: special diets, including fat free diet, low carb, diet, vegetarian diet, Kosher food only, or other special diet.

The system can suggest one or more recipes that more closely match the user's preferences, the available ingredients, and the desired serving size, and the recipe can then be prepared by or for the user. Because the system may not be aware of all the ingredients in the user's possession, the user can manually specify that the user does or does not have certain ingredients available, and the foregoing information can affect the recipes recommended to the user.

By way of further example, the system can present on a display a list of recipe titles (e.g., teriyaki chicken, fried chicken, butter chicken, etc.), optionally with a brief listing of the main ingredients. The user can then select a listed recipe, the complete recipe (including a complete ingredient listing, ingredient quantities, cooking temperature, etc.) is then displayed, and the user can optionally print out the recipe. Because system may not be aware of all the ingredients in the user's possession, the user can manually specify that the user does or does not have certain ingredients available. By way of example, some or all of recipe information (e.g., cooking temperature and time) can be transmitted to a cooking device, such as an oven, which can use the information in the cooking process.

By way of further example, as similarly discussed above, the system optionally reminds the user to replace a product before the expiration date gathered through products tags. The system can optionally be configured by the user to automatically trigger orders within a predetermined amount of time prior to the expiration date. Optionally, the order timing can be based in part on the time it takes to deliver the order once the order is placed, where, for example, the order will be placed to ensure the order will arrive on, or shortly before the expiration date. In addition, the user can optionally specify, via a user interface, that for future orders if an order value is below a certain amount and/or a delivery charge is greater than a certain cost, the order should not yet be placed. Optionally, the system determines if an item has been removed from a storage area (e.g., a refrigerator) by comparing previous scanned information with current scan information. If the system does not locate the item within a storage area within a predetermined amount of time (e.g., an hour, 4 hours, 8 hours, 12 hours, or 24 hours), the system optionally infers that the item has been fully consumed, and adds the item to an order. Optionally, the predetermined amount of time is settable by a user.

The physical configuration of the refrigerator storage areas can be stored in computer local or remote physical memory. By way of example, the configuration information includes the placement, depth, width and height dimensions of the refrigerator and/or freezer storage areas. The configuration information can also store information regarding storage areas intended to store a particular type of food product. For example, information (e.g., dimensions, special temperature settings, etc.) regarding vegetable drawers, fruit drawers, dairy product storage areas, and the like can be stored. Shelve and drawer weight limitations (e.g., recommended maximum weight) are optionally stored as well. Certain configuration information can optionally be downloaded over a network from a remote computer system (e.g., from a Web site associated with the refrigerator or the system provider) based on, for example, the refrigerator model or serial number.

In addition, the system can record which storage locations are occupied, and which locations are available for additional storage.

The system can compare some or all of the foregoing information with product and packaging information (such as volume and dimensions including depth, width and height), that can be read from the item tag or retrieved from a local or remote database using an item identifier read from the item tag, enables the system, and determine one or more ways to organize items on shelves and in drawers. Optionally, the system can provide a user with suggestions or recommendations on how to organize the refrigerator and freezer by suggesting placement of products with respect to storage shelves and drawers.

By way of illustration, the system can compare product dimensions and/or weight with the refrigerator or shelf configuration and/or available locations, and using the comparison results, suggest where a product or products should be placed via a user interface. This information can be presented in a touch screen display or other user interface. By way of example, the system can display a three dimensional representation of items already on storage shelves, and then highlight items that are first to be removed as part of the reorganization process. Once the user has removed the indicated items, the system displays where each of the removed items are to be placed on the storage shelves. Optionally, the system provides a printout of stored items and the storage locations so that the user can easier locate items and determine if the user has a certain items, and without having to physically search for items. Optionally, an "expired" control is provided, which, when activated, causes the system to display and/or printout a list of expired items and their locations.

Optionally, the system provides a user interface with a search field, wherein the user can enter in the name of an item or an item type. The system then searches its database to locate matches or near matches, and display search results to the user. The search results can include a list of the matches or near matches, the quantity of the matching and near matching items, and their storage locations.

As similarly described above, optionally, the system, via a suggestion user interface, provides item suggestions and recommendations to the user. For example, the system can suggest items to be consumed (e.g., via a meal recommendation including one or more of an appetizer, a main course, dessert, and/or a drink) based on item availability in the user's house and/or on information input by one or more users (e.g., members of the household, one or more physicians of a household member, etc.). For example, the user information can include food preferences, special diets, modes, etc., input by the user via a keyboard, a touch screen, voice recognition, or other input method.

Optionally, the system stores different profiles and preferences for different users in the same household. Optionally, when a user wants the system to provide a meal recommendation, the user activates a physical or a soft meal suggestion icon or button. The system then retrieves the names of household members from its database, and presents the names of the household members on the meals suggestions user interface, optionally in addition to an "entire household" control. In order to indicate who will be participating in the meal, the user can select one or more of the household member names, or the "entire household".

Optionally, a user interface is provided via which the user can indicate which type of meal (e.g., breakfast, brunch, lunch, dinner), meal courses (e.g., salad, soup, appetizer, main course, dessert), and a food-type category (e.g., fish, meat, etc.) the user wants. The system will then access the profiles and preferences of the meal participants, as well as the item inventory, and provide a corresponding meal recommendation.

Optionally, a user can trigger or provide a command through a system user interface to communicate to the central system or directly to a service provider, such as a laundry company or a newspaper/magazine service provider, to directly order their service or to trigger a request for servicing, such as the service of picking up or delivering goods, and/or to suspend a service, such as to suspend newspaper delivery for a specified period of time.

Optionally, the system can further include a voice recording device and/or the voice recording device can be independent of the system. The voice recording device can include digital memory (e.g., a disk drive, FLASH memory, etc.) or analog memory (e.g., a cassette tape). A user can record a product description on the device by activating a record control, which can be in the form of a button, a switch, a voice recognition command or other record triggering method. In an example embodiment, the device records a product description verbally provided by the user and creates a digital file. The description can be provided as part of a verbally provided product order. Optionally, a different file is created for each recorded production description. The device transfers the file to a remote database over a network such as the Internet. The transfer can be performed substantially immediately, in response to a user command, or on a scheduled basis.

A remote computer processing system receives, stores, and accesses such files, which can be received from a plurality of voice recording devices. The remote computer system then utilizes voice recognition software to translate the voice recording files into text files. Optionally, the voice recognition software increases recognition accuracy by, when there are more than one potential word matches, placing more weight on words related to the types items being purchased (produce, cereal, milk, etc.) and the users past purchase history. The remote computer system can optionally match the spoken order with a SKU (Stock Keeping Unit, e.g., an identifier, such as a unique numeric identifier associated with a specific product) retrieved from a SKU database. The SKU database optionally stores SKUs in association with a text description of the corresponding item. For example, if the user verbally ordered a cereal by name, the remote computer system translates the name into text or other computer readable form, and matches the text with text stored in association with a SKU (or other identifier) to locate the correct SKU. Optionally, the voice recognition and/or SKU matching and identification can be performed instead or additionally by the user's local system.

The remote computer processing system optionally shares a text version (e.g., the textual representation of the order and/or the corresponding SKU) and/or recorded verbal version of the order. For example, the remote computer system can share the text and/or verbal version of the order via a web site, telephone, fax, short messaging system, or via other communication techniques. Thus, for example, the system can textually share an order that had been placed verbally with one or more product suppliers and/or with the user. For example, the remote system can add the item(s) identified in the verbal order to the user's shopping cart or other shopping list, optionally in association with a digital file that includes the user's spoken order. Users can then verify the text conversion of the spoken order. For example, the user can click on an item in an order list for which verification is requested, hear the user's previously recorded order, and determine if the written description in the shopping list matches the user's spoken order. Optionally, the system uses individual consumer information, such as the user's location and the user's account information and preference profile to better match the user's spoken order with a product. The system uses the product identification (e.g., SKU) generated from the verbal order to request quotes from providers, provide quotes to the user, and to offer additional or alternative products to the user. The user can then place an order for the identified product.

Optionally, the system does not provide voice recognition. Instead, an icon corresponding to the voice recording appears in the user's online shopping list (e.g., an electronic shopping cart). Optionally, the icon has an associated recording date displayed therewith. The user can click on the icon, the system will play the recording to the user, and the user can manually key in the product name and/or search an online catalog.

Optionally, in addition or instead, a picture of an item the user wants to order can be taken using a camera coupled to the system, a cell phone camera, a standalone camera, or other camera. The picture can be transmitted by the system or otherwise to the remote system. The remote system can then perform image recognition to come up with a "signature" identifying the item. The remote system can then locate a corresponding SKU from a SKU database, which optionally stores image signature information and/or an image, in association with a corresponding SKU. The remote system uses the product identification (e.g., SKU) generated from the image to request quotes from providers, provide quotes to the user, and to offer additional or alternative products to the user. The user can then place an order for the identified product. While the foregoing verbal and photographic order processes can be used with a variety of item types, it can be particularly useful with respect to items that often do not have bar codes, such as fresh fruits (e.g., a single apple) or vegetables.

Optionally, the system does not provide image recognition. Instead, a thumbnail (or larger image size) version of the picture of the item, corresponding to the image captured by the camera, appears in the user's online shopping list (e.g., an electronic shopping cart), displayed on the user's local display. Optionally, the displayed picture has an associated image capture date displayed therewith. The user can click on the picture, and the system will optionally display a larger version of the picture. Thus, the picture acts as a reminder to the user. The user can then manually key in the product name and/or search an online catalog and/or the user's purchase history for the product to thereby add the product to the order list.

Example embodiments will now be described with reference to the figures. Referring to FIG. 1, an item tracking and recommendation processing system 100 includes a central processing unit 102, computer readable memory 104 (e.g., removable and/or fixed: volatile memory, such as RAM, non-volatile memory, such as FLASH EEPROM, a hard disk drive, an optical drive, etc.), and a database 106, which can be stored, in whole or in part in the computer readable memory 104. A network interface 108 (e.g., a wireless or wired network interface) is provided to enable the item tracking and recommendation processing system 100 to access and/or transmit data (e.g., dimensional data regarding a refrigerator or other item storage system, recipes, user preference information, user account information, etc.) across a network, such as the Internet, a local network, and/or other network. The interface 108 can optionally include one or more of a digital subscriber line (DSL) interface, a T1 line interface, a satellite link, a cable hookup, a dial-up modem, etc. The system 100 can further include wired and/or wireless digital and/or analog input/output interfaces to receive and/or transmit information to one or more tag scanning sensors and/or presence sensors.

The system 100 can include and/or be coupled to one or more user interface devices (e.g., a touch screen display, a printer, a keyboard, dedicated mechanical keys, voice recorder, etc.). For example, the system 100 can be coupled to one or more user interface devices, sensors, scanners, and/or other systems via a USB or FireWire bus, via a wired local network, such an Ethernet network, and/or a wireless network, such as an iEEE 802.11b or IEEE 802.11g compliant network, or a Bluetooth network.

The example database 106 includes recipes, content information for one or more item storage units (e.g., refrigerator(s), pantry, etc.), household members and/or frequent visiting meal participants, user preferences (e.g., food preferences, item ordering preferences, payment preferences, etc. of household members and/or frequent visitors), a system serial number, and the like. The database 106, optionally also includes dimensional and configuration information for one or more storage units (e.g., available temperature settings, the existence of vegetable drawers, fruit drawers, dairy product storage areas, shelve and drawer weight limitations, etc.). For example, the database 106 can store a mapping of product codes or SKUs to product names, sizes, and packaging materials, as well as content information regarding items placed into storage units. Optionally, the database 106 stores shopping lists, passwords and/or unique identifiers for accessing remote databases and services.

The following is an example database schema that includes fields for payment preferences, storage unit identifiers for one or more storage units (e.g., one or more refrigerators), storage unit shelf dimensions, food preferences for one or more users (e.g., food preferences for breakfast, brunch, lunch, dinner, food avoidances, medical or other dietary restrictions, etc.), and order generation/trigger preferences.

User Database Schema

| FIELD | DATA DESCRIPTION |
|---|---|
| Alternative Form of Payment | Alternative form of payment (credit card, electronic fund transfer, check, place on account, etc.), and corresponding payment information (credit card number, and credit card expiration date, bank account number, checking account number, etc.) |
| Refrigeration Unit 1 Identifier | Unique identifier, such as a serial number, associated with a first of the user's disposal units |
| Refrigeration Unit 1 Capacity | The capacity in units of measurement (gallons, liters, etc.) of Disposal Unit 1 |
| Shelf 1 | Shelf 1 dimensions |
| Shelf 2 | Shelf 2 dimensions |
| Shelf n | Shelf n dimensions |
| User 1 Food Preferences | Food preferences - Breakfast |
| | Food avoidance - Breakfast |
| | Food preferences - Brunch |
| | Food avoidance - Brunch |
| | Food preferences - Lunch |
| | Food avoidance - Lunch |
| | Food preferences - Dinner |

-continued

| FIELD | DATA DESCRIPTION |
|---|---|
| User n Food Preferences | Food avoidance - Dinner<br>Dietary restrictions<br>Food preferences - Breakfast<br>Food avoidance - Breakfast<br>Food preferences - Brunch<br>Food avoidance - Brunch<br>Food preferences - Lunch<br>Food avoidance - Lunch<br>Food preferences - Dinner<br>Food avoidance - Dinner<br>Dietary restrictions |
| Order Generation Preference | Generate/submit order preferences |

The following is an example contents database schema that stores item information for the contents of one or more storage units. The information, or selected portions thereof, may have been scanned by one or more scanners from an item tag, manually entered by the user, or retrieved from a remote database using the item SKU or other identifier. The example schema includes fields for a product code, ingredients, calories, a diet category, a product name, dimensions, weight, an expiration date, a manufacturer, item location, item storage temperature, and cooking guidelines.

Contents Database Schema

| FIELD | DATA DESCRIPTION |
|---|---|
| Product code | The item SKU |
| Ingredients | The item ingredients |
| Calories | The number of calories in the item or the number of calories per item unit |
| Diet Category | low sodium, low cholesterol, low carbohydrate, non-fat, peanut-free, gluten-free, sugar-free, non-dairy, vegetarian, etc. |
| Product name | The text name of the item |
| Dimensions | One or more of length, width, height, diameter, volume |
| Weight | Original pre-use weight |
| Expiration date | Item expiration or "best if used by" date |
| Manufacturer | The name of the manufacturer or other manufacturer identifier |
| Location Information | Storage unit and/or shelf identifier of where item is stored |
| Storage Temperature | The temperature or temperature range at which the item is to be stored |
| Cooking Information | The temperature or temperature range at which the item is to be cooked, cooking time, cooking method (boiling, roasting, broiling, frying, microwave, etc.) |

Recipe Database Schema

The following is an example recipe database schema. The example schema includes fields for ingredients (e.g., ingredient names, and amount per serving or per a specified number of servings), cooking instructions, calories per serving, and other nutritional information, such as the amount of one or more of salt, carbohydrates, protein, fiber, fat, vitamins, etc. per serving and/or the % percentage of a recommended daily amount of the foregoing a serving will provide.

| FIELD | DATA DESCRIPTION |
|---|---|
| Ingredient 1 | Name and amount per serving |
| Ingredient 2 | Name and amount per serving |
| Ingredient n | Name and amount per serving |
| Cooking Instructions | Cooking method(s), time, temperature, etc. |
| Calories/serving | |
| Salt, carbohydrates, protein, fiber, fat, vitamins/serving | |

Figure 2:
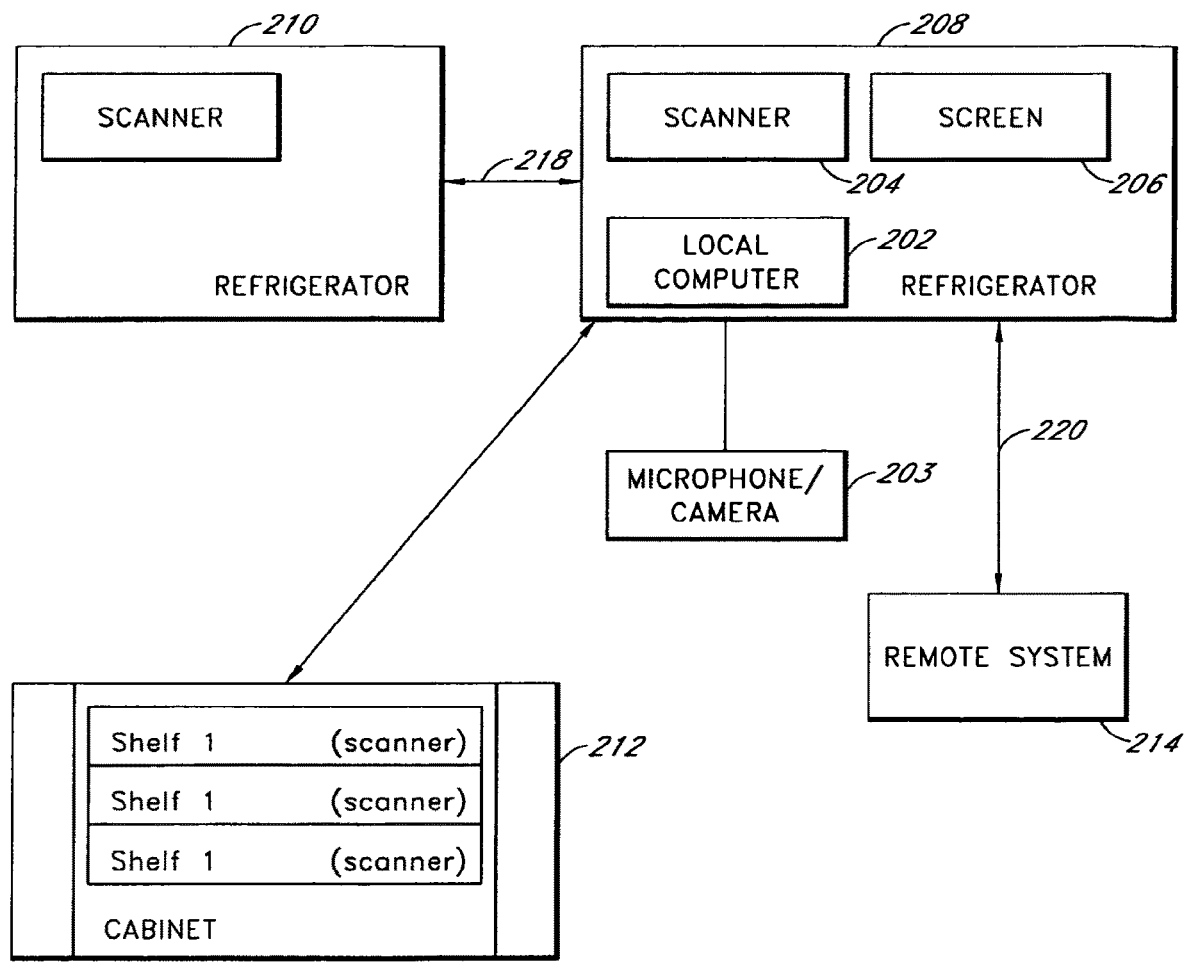
FIG. 2 illustrates an example embodiment of a networked storage system.

FIG. 2 illustrates an example embodiment of a networked storage system. A computer system 202 (which can be in the form of system 100 illustrated in FIG. 1), is coupled to a local scanner 204, a screen 206 (e.g., a touch screen that can receive user inputs via finger and/or pen), and optionally a microphone and/or camera 203. The microphone is optionally coupled to a digitizer which converts spoken language into a digital representation. The camera can be a digital still and/or video camera that captures images and stores them digitally and/or in analog form. The computer system 202, scanner, 204, and/or screen 206 optionally are physical, and optionally removably, mounted to a refrigerator 208. The computer system 202, scanner, 204, and/or screen 206 can optionally be mounted on a wall, a stand, or other supporting structure. The computer system 202 is optionally coupled to remote scanners via networks 218, 220 (e.g., WiFi networks). The remote scanners are mounted to and/or configured to scan one or more other storage units, such as refrigerator 210 and cabinet 212. Optionally, a storage unit, such as cabinet 212, includes multiple shelves with corresponding scanners. Thus, optionally, one computer system can collect and store information scanned from items stored in multiple storage units. Optionally, each storage unit can have a computer system that incorporates some or all of the elements of system 100.

Figure 3:
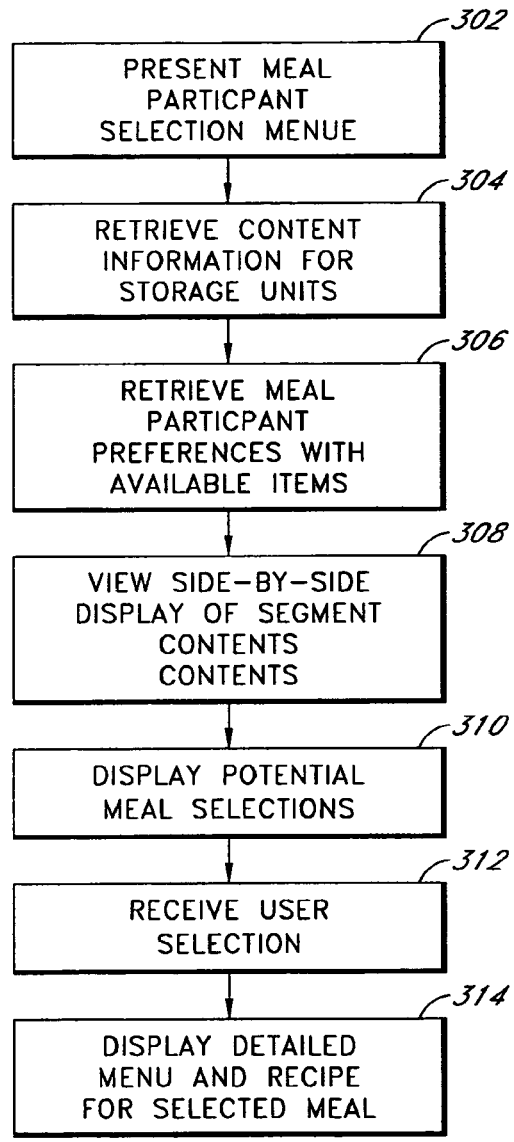
FIG. 3 illustrates an example meal suggestion process.

FIG. 3 illustrates an example meal suggestion process. At state 302, a user interface is displayed by an item tracking and recommendation processing system (ITRP), via which a user can indicate who is going to participate in a meal and the meal type (breakfast, lunch, dinner). Optionally, the system can infer the meal type based on the time of day by reading a real time clock (e.g., if the request is at 8:00, the system infers the meal is breakfast). At state 304, the ITRP retrieves information regarding which items are currently available (e.g., in one or more household storage units). At state 306, the system retrieves food preference information for selected meal participants. At state 308, the system matches user preferences and item availability for the meal type. At state 310 the system displays information regarding one or more meals that meet the user preferences and that can be prepared using the available food items. At state 312, the system receives a user selection of the displayed meals. At state 314, the system displays a detailed menu corresponding to the user selection.

Figure 4:
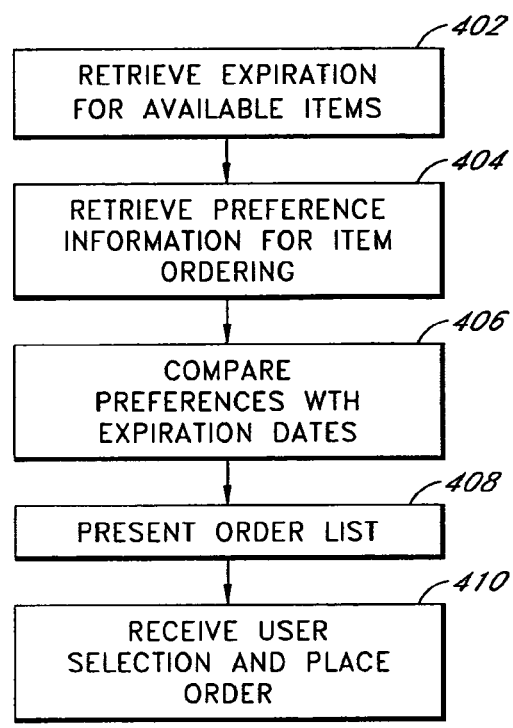
FIG. 4 illustrates an example order generation process.

FIG. 4 illustrates an example order generation process. At state 402, the system retrieves expiration date information for items within one or more storage units (e.g., a refrigerator and/or cabinet). At state 404, the system retrieves a user preference regarding when an order should be generated relative to at least item expiration dates (e.g., a time prior to an expiration date selected by the user wherein the system is to ask the user if an item should be placed, also referred to as a time window). At state 406, the system compares the user preference with the expiration date information and determines which items have expiration dates that fall within the window. By way of example and not limitation, the time window can be one day or less, greater than one day, and/or selected based upon a projected delivery date or time. At state 408, the system presents to the user via a display device a list of items identified at state 406 and asks the user to select which items are to be ordered. At state 410, the system receives the user selections and orders the selected items from a provider selected by the user.

FIG. 5 illustrates an example meal suggestion request user interface. The interface includes a Meal Selection section, wherein the user can indicate for which meal the user wants suggestions. In the illustrated example, the user can select from: breakfast, brunch, lunch, dinner, and a late night snack. A courses section allows the user to indicate what courses suggestions are to be provided for. The course selection optionally changes depending on the meal selection. For example, if the user selects breakfast, optionally, the course selection will not include soup or salad options. A "meal participants" user interface enables the user to indicate who is going to participate in the meal. The example list is based on user set-up information, wherein the user specifies household members and others that will be participating in the meal. In this example, a guest field is provided wherein the user can specify the number of guests attending for which food preference information is not available in the system database. The system can use the guest number information when providing ingredient quantities as part of recipes. Referring back to FIG. 5, a "provide recommendations" control is provided, which, when activated will cause the system to provide one or more meal recommendations.

FIG. 6 illustrates another example meal suggestion request user interface. The interface provides one or more course suggestions in response to the user selections made via the interface illustrated in FIG. 5, user food preferences, and item availability. In this example, suggestions are provided for a salad, a main course, and a dessert. Once the user selects the desired suggestions, the user can activate a "provide recipe" control, and the system will then provide the corresponding recipes, with the recipe portions scaled to the number of meal participants. The user can optionally activate a "provide additional suggestions" control, and the system will provide additional suggestions for courses wherein the user has not yet made a selection.

FIG. 7 illustrates an example user interface for ordering items. The example list includes items whose expiration dates are within a predetermined window and/or items were present in a storage unit (e.g., a refrigerator), but which the system has determined is no longer in the storage unit (e.g., has been removed from the storage unit and not replaced within a predetermined amount of time). The user can select which items are to be ordered and the quantity of the items. Optionally, the system defaults by placing check marks for each item and the user unchecks the item if the user does not want to order the item. Optionally, the system provides a default quantity, which can be based on a previous user specified value and/or on consumption patterns.

Figure 8:
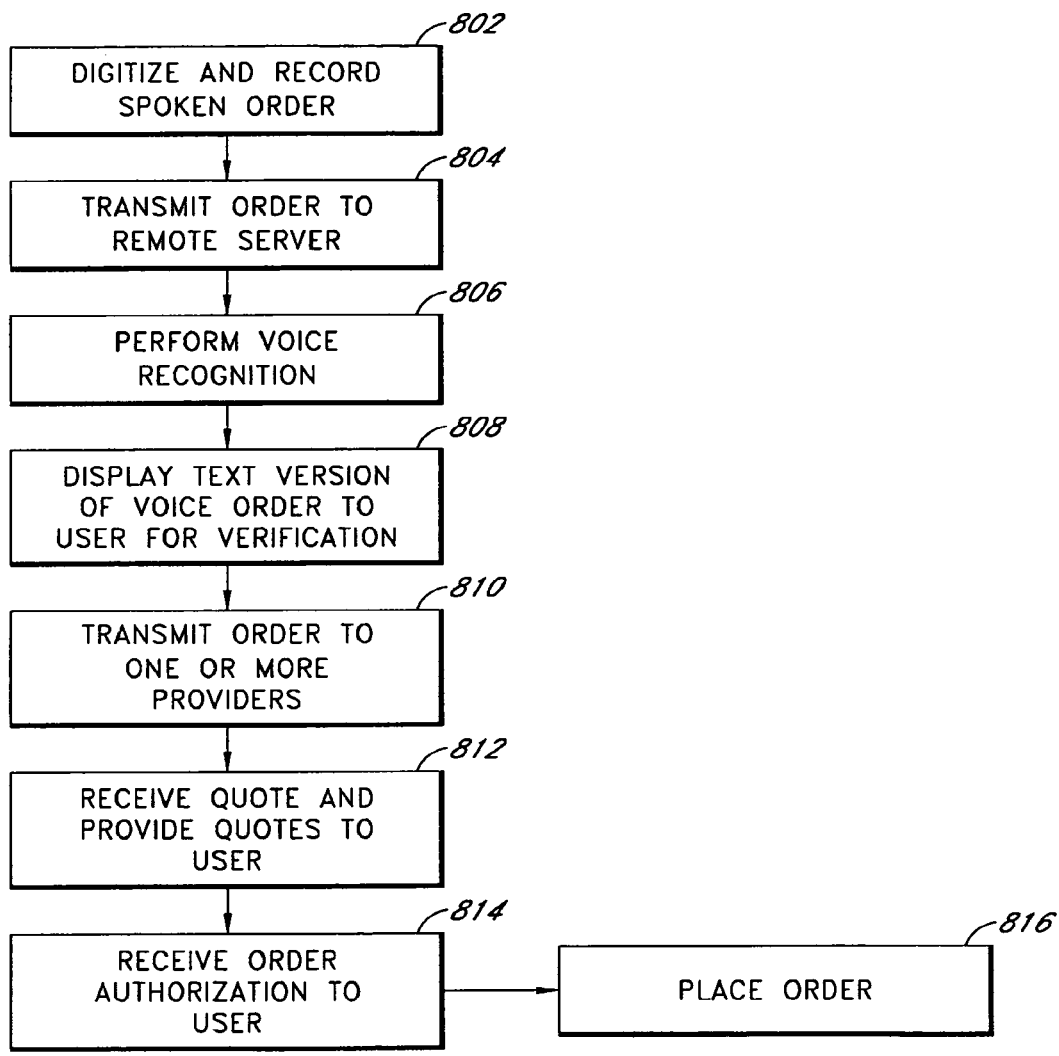
FIG. 8 illustrates an example method for processing a voice order.

FIG. 8 illustrates an example method for processing a voice order. At state 802, the user verbally provides an order. By way of illustration, the user may press a "record shopping list" control. In response, the system can prompt the user via a system display and/or via spoken instruction to verbally record a shopping list or a portion thereof. The recording can be intended as a reminder. The user may be given a limited amount of time (e.g., 5 seconds, 10 seconds, 30 seconds, 1 minute) to speak the order. The system can inform the user of the limited time, and provide a clock or other indicator (e.g., a countdown timer) that continuously displays the time remaining to record the order. Optionally, the user can be provided with an "extend recording time" control, via which the user can cause the system to provide additional recording time. At the end of the recording time, the user is optionally provided the opportunity to review the recording (e.g., have the recording played back), and to delete and re-record the shopping list if the previous recording was unsatisfactory.

For example, the user can speak the order to the microphone 203, illustrated in FIG. 2. The system then digitizes and records the spoken order in a file. At state 804, the system transmits the digitized verbal order to a remote system, such as remote system 214. At state 806, the remote system performs voice recognition on the order in order to interpret the spoken order and converts the spoken order into text. By way of example, the remote system can use grammar constrained recognition and/or natural language recognition. The voice recognition system optionally uses training. At state 808, the remote system transmits the text version of the order to the user so that the user can verify if text version is an accurate interpretation of the spoken order. For example, the remote system can transmit the text version to the system 202 or another user computer for display to the user. Optionally, if the user determines that the order was not correctly translated, the user can provide a corrected order (e.g., via a keyboard, or by speaking the order again) to the remote system.

At state 810, the remote system transmits the translated version of the order (e.g., the text version) to one or more providers (e.g., supermarkets, wholesale establishments, etc.) in order to receive quotes. The remote system can optionally match the translated version of the spoken order with a SKU retrieved from a SKU database, which stores SKUs in association with a text description of the corresponding item, and transmit the SKU to the providers. At state 812, the remote system receives quotes from the potential providers, and transmits the quotes to the user. At state 814, the user selects a provider and authorizes placement of the order. At state 816, the remote system places the order with the selected provider.

It should be understood that certain variations and modifications of this invention would suggest themselves to one of ordinary skill in the art. The scope of the present invention is not to be limited by the illustrations or the foregoing descriptions thereof.

What is claimed is:

1. A computer-implemented method, the method comprising:
 (a) receiving over a network at a first computer system, using a network interface, a digitized spoken user order from a second computer system, the second computer system comprising:
  a microphone, a wireless network interface, and a digitizer coupled to the microphone, wherein the digitizer is configured to convert spoken words into a digital representation, and the second computer system is configured to transmit the digital representation over the network to the first computer system;
 (b) translating at least a portion of the digitized spoken order to text;
 (c) using the text, translated from the digitized order, to identify a preference associated with the user or with at least one other user and corresponding to the text;
 (d) receiving from the user, via a user interface, a request for a meal suggestion;
 (e) identifying a time of day;
 (f) inferring a meal type associated with the identified time of day;

(g) identifying at least one item available for use by the user;

(h) identifying at least one meal suggestion of the inferred meal type associated with the identified time of day, based at least in part on the preference associated with the user or with the at least one other user and on the identified item, the at least one meal suggestion matching the preferences associated with the user or with the at least one other user; and (i) enabling the meal suggestion, including the identified item, to be displayed to the user via a user display.

2. The computer-implemented method of claim 1, further comprising:

storing the identified preference associated with the user or the at least one other user in a database; and when identifying the at least one recipe, obtaining the stored preference associated with the user or the at least one other user.

3. The computer-implemented method of claim 1, wherein the at least one item available for use by the user is disposed in a storage location, and wherein the identifying of the at least one item comprises:

capturing at least one product image of at least one product in the storage location, by a camera positioned to capture images of products in the storage location; and performing object recognition with respect to the at least one product image of the at least one product in the storage area, thereby to identify the at least one item.

4. The computer-implemented method of claim 1, wherein the preferences associated with the user or with the at least one other user include at least one of food preferences of the user or of the at least one other user, meal-specific food preferences of the user or of the at least one other user, food avoidances of the user or of the at least one other user, medical dietary restrictions of the user or of the at least one other user, or food preferences of the user or of the at least one other user.

5. The computer-implemented method of claim 1, further comprising, prior to the identifying of the at least one meal suggestion, receiving a user input providing a list of users participating in the meal, whose preferences should be considered when identifying the at least one meal suggestion, wherein, the identifying of the at least one meal suggestion comprises identifying at least one meal suggestion using the identified item and matching the preferences of all users in the list of users.

6. The method of claim 5, further comprising, prior to the receiving of the user input of the list of users, presenting to the user a list of other users associated with the user, and wherein the receiving of the user input comprises receiving user selections from the list of other users associated with the user.

7. The computer-implemented method of claim 5, further comprising, prior to the identifying of the at least one meal suggestion:

receiving, at the first computer, a user input providing the preferences of at least one user in the list of users participating in the meal; and storing the preferences of the at least one user in the list of users participating in the meal.

8. The computer-implemented method of claim 7, wherein the receiving of the user input providing the preferences of the at least one user in the list of users participating in the meal comprises:

receiving over the network at the first computer system, using a network interface, a second digitized spoken user order;

translating at least a portion of the second digitized spoken order to text;

using the text, translated from the second digitized order, to identify a preference associated with the at least one user in the list of users participating in the meal and corresponding to the text.

9. A computer-implemented method, the method comprising:

(a) receiving over a network at a first computer system, using a network interface, a digitized spoken user order from a second computer system, the second computer system comprising:

a microphone, a wireless network interface, and a digitizer coupled to the microphone, wherein the digitizer is configured to convert spoken words into a digital representation, and the second computer system is configured to transmit the digital representation over the network to the first computer system;

(b) translating at least a portion of the digitized spoken order to text;

(c) using the text, translated from the digitized order, to identify a preference associated with the user or with at least one other user and corresponding to the text;

(d) receiving from the user, via a user interface, a request for a meal suggestion;

(e) identifying at least one item available for use by the user;

(f) identifying at least one meal suggestion, based at least in part on the preference associated with the user or with the at least one other user and on the identified item, the at least one meal suggestion matching the preferences associated with the user or with the at least one other user; and (g) enabling the meal suggestion, including the identified item, to be displayed to the user via a user display.

10. The computer-implemented method of claim 9, further comprising:

storing the identified preference associated with the user or the at least one other user in a database; and when identifying the at least one recipe, obtaining the stored preference associated with the user or the at least one other user.

11. The computer-implemented method of claim 9, wherein the at least one item available for use by the user is disposed in a storage location, and wherein the identifying of the at least one item comprises:

capturing at least one product image of at least one product in the storage location, by a camera positioned to capture images of products in the storage location; and performing object recognition with respect to the at least one product image of the at least one product in the storage area, thereby to identify the at least one item.

12. The computer-implemented method of claim 9, wherein the preferences associated with the user or with the at least one other user include at least one of food preferences of the user or of the at least one other user, meal-specific food preferences of the user or of the at least one other user, food avoidances of the user or of the at least one other user, medical dietary restrictions of the user or of the at least one other user, or food preferences of the user or of the at least one other user.

13. The computer-implemented method of claim 9, further comprising, prior to the identifying of the at least one meal suggestion, receiving a user input providing a list of users participating in the meal, whose preferences should be considered when identifying the at least one meal suggestion, wherein, the identifying of the at least one meal suggestion comprises identifying at least one meal suggestion using the identified item and matching the preferences of all users in the list of users.

14. The method of claim 13, further comprising, prior to the receiving of the user input of the list of users, presenting to the user a list of other users associated with the user, and wherein the receiving of the user input comprises receiving user selections from the list of other users associated with the user.

15. The computer-implemented method of claim 13, further comprising, prior to the identifying of the at least one meal suggestion:

receiving, at the first computer, a user input providing the preferences of at least one user in the list of users participating in the meal; and storing the preferences of the at least one user in the list of users participating in the meal.

16. The computer-implemented method of claim 15, wherein the receiving of the user input providing the preferences of the at least one user in the list of users participating in the meal comprises:

receiving over the network at the first computer system, using a network interface, a second digitized spoken user order;

translating at least a portion of the second digitized spoken order to text;

using the text, translated from the second digitized order, to identify a preference associated with the at least one user in the list of users participating in the meal and corresponding to the text.

\* \* \* \* \*